Aug. 30, 1960 A. U. BRYANT 2,950,897
VALVE CONSTRUCTION
Filed April 19, 1956 5 Sheets-Sheet 3
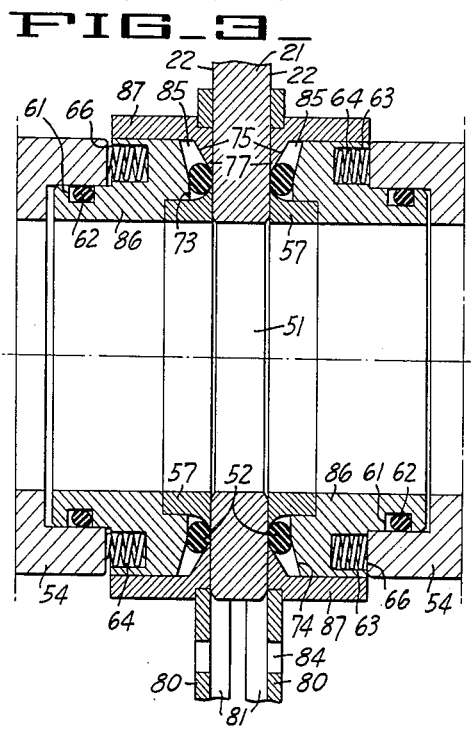
FIG_3_
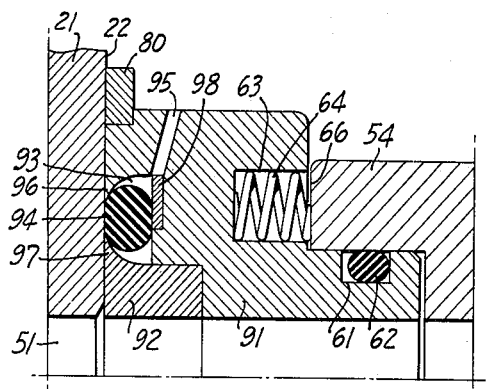
FIG_4_
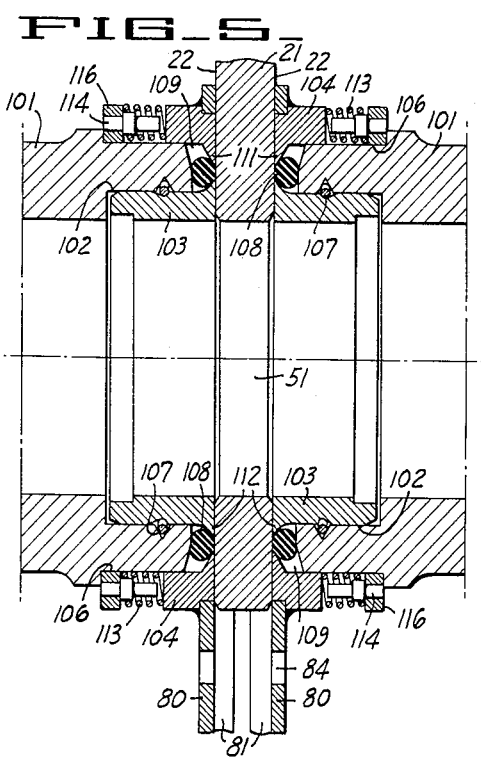
FIG_5_
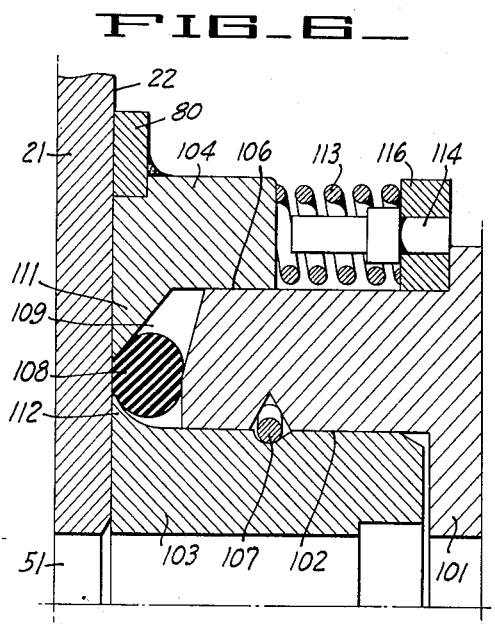
FIG_6_
INVENTOR.
Austin U. Bryant
BY
ATTORNEYS

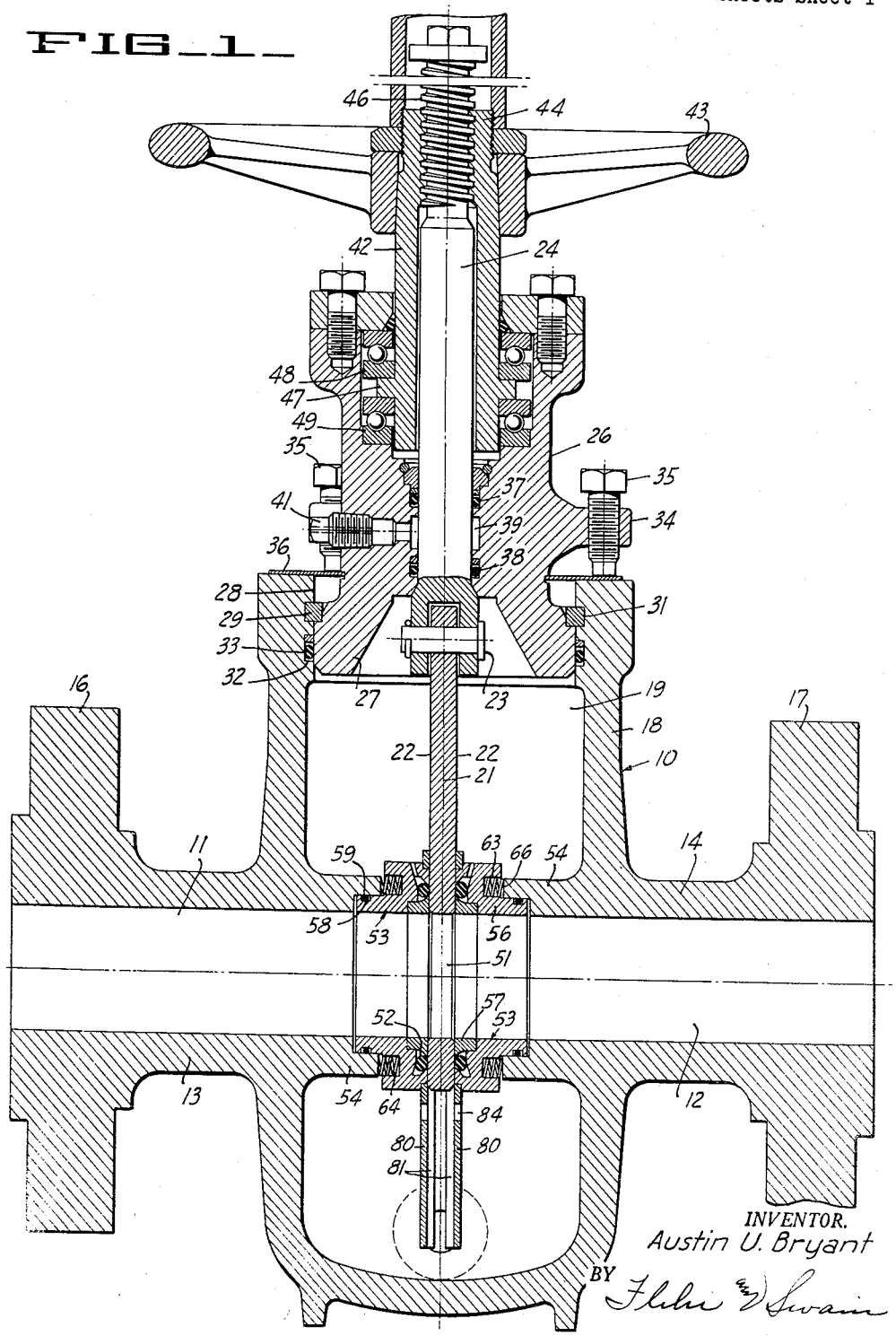

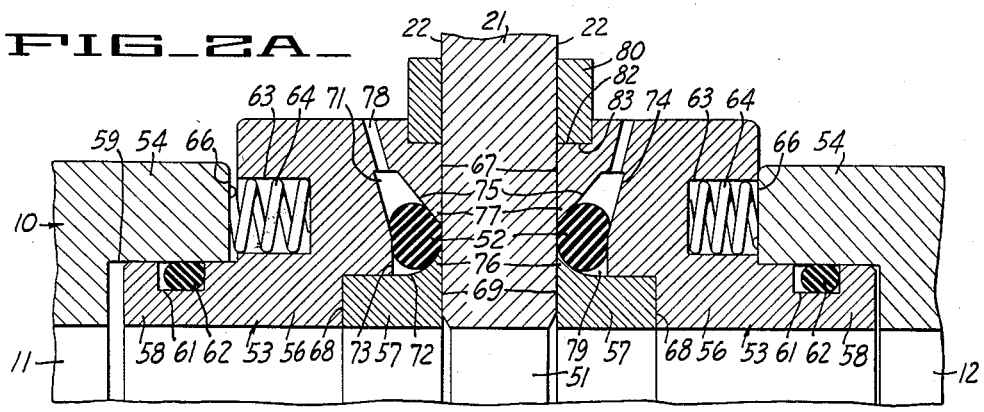
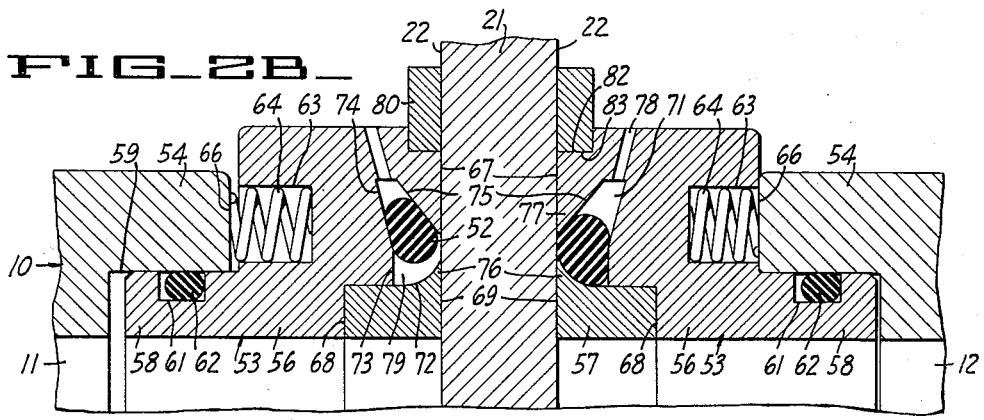
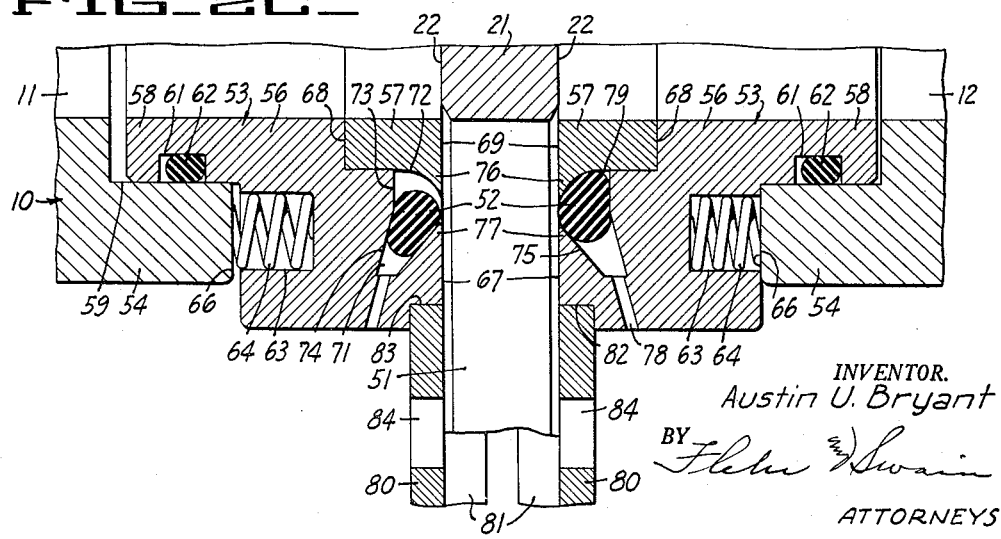

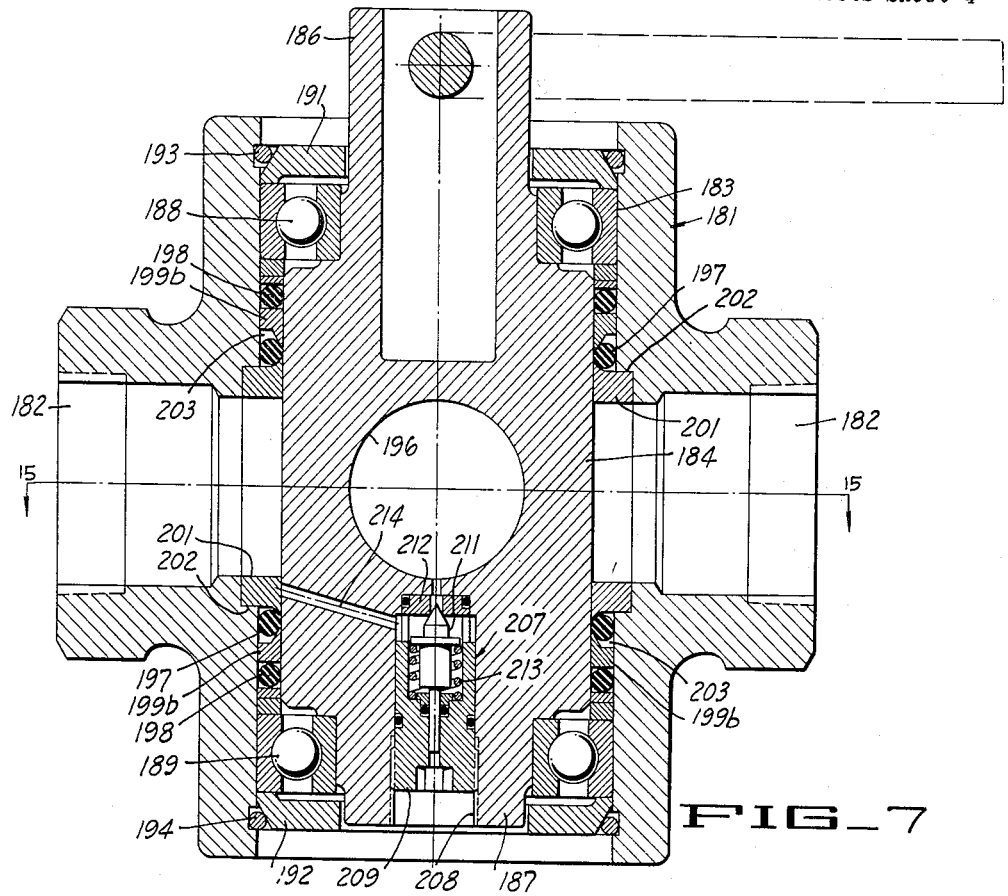
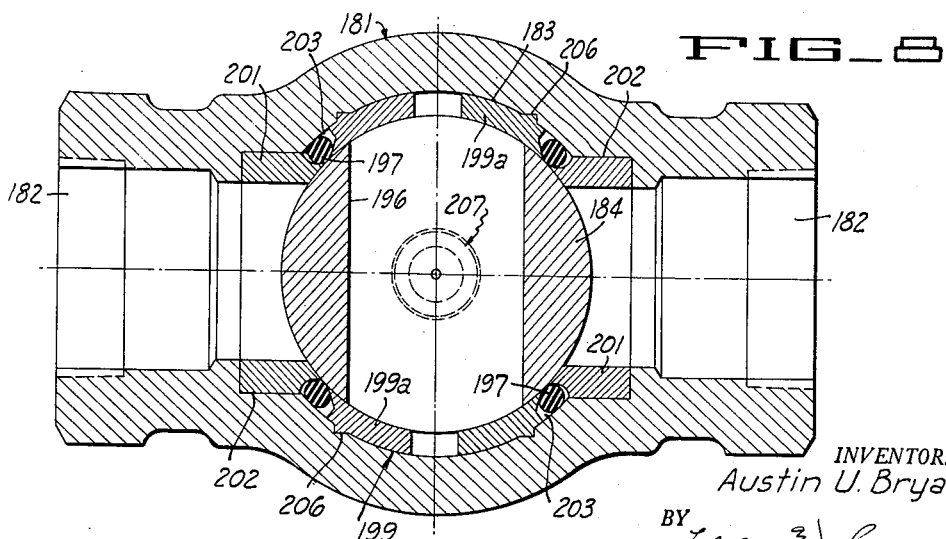

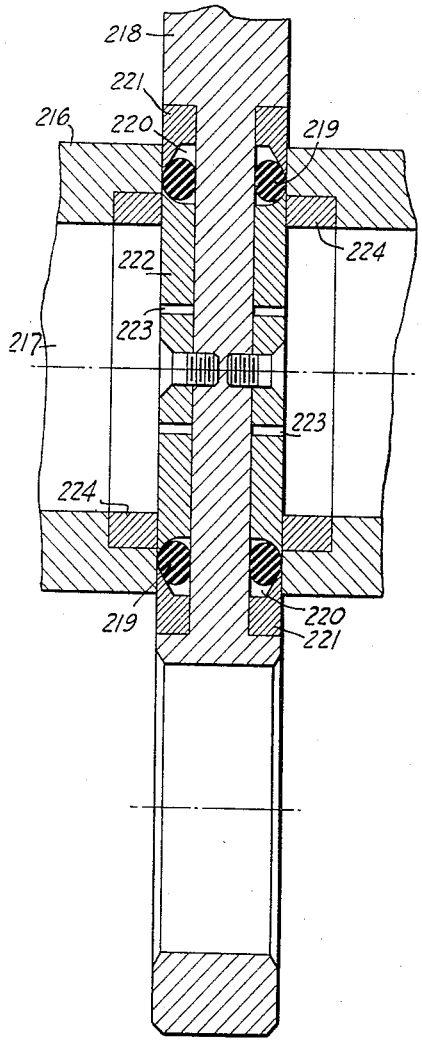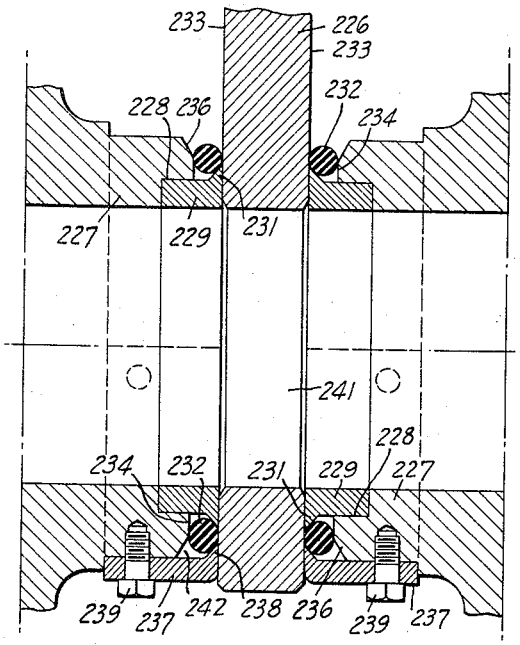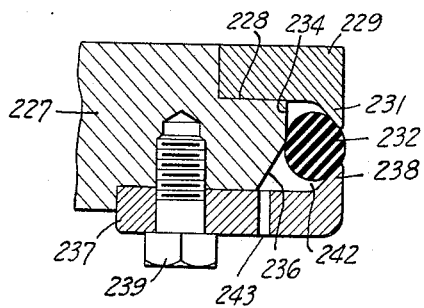

United States Patent Office 2,950,897
Patented Aug. 30, 1960

2,950,897

VALVE CONSTRUCTION

Austin U. Bryant, Walnut Creek, Calif., assignor, by mesne assignments, to Walworth Company, New York, N.Y., a corporation of Massachusetts Filed Apr. 19, 1956, Ser. No. 579,184

7 Claims. (Cl. 251—172)

This invention relates generally to valves of the type used for controlling flow of various fluids, including gases and liquids.

In my copending application, Serial No. 475,106, filed December 14, 1954, now Patent No. 2,810,543, issued October 22, 1957, there is disclosed a valve of the O-ring sealed type in which resilient O-rings are disposed on opposite sides of a gate or plug member, and serve to establish fluid tight seals between the plug or gate and the body. A special mounting means is disclosed in said copending application for retaining the O-rings in such a manner as to prevent their dislodgement under various operating conditions, and with application of relatively high line pressures, such as pressures of the order of 1,000 p.s.i. or higher. The particular embodiments disclosed in said application 475,106 prevent dislodgment of the O-rings by mechanical retention means and by pressure equalization or venting of the bottoms of the O-ring accommodating grooves. A characteristic of the embodiments disclosed in said application 475,106 is that pressure seals are maintained on both the upstream and downstream sides of the valve gate. Although such an O-ring sealed valve is desirable for many commercial applications, there are some instances where it is desired to establish a seal only upon the downstream side of the gate, whereby the pressure in the body space tends to be substantially the same as the inlet pressure. Also there are some applications where it is desirable to use O-rings that are relatively soft (e.g. 60 to 80 durometer) compared to the relatively hard O-rings (e.g. 80 to 100 durometer) which I prefer to use in valves of the type disclosed in said copending application, without dislodgment of the O-rings for various operating conditions.

In general it is an object of the invention to provide an O-ring seal valve of the above character in which dislodgment of the O-rings during operating conditions is avoided by the use of a novel construction.

It is another object of the invention to provide an O-ring sealed valve of the above type characterized by the fact that the primary seal between the valve member and the body is established on the downstream side, and that this feature is utilized to aid in preventing dislodgment of the O-rings for various operating conditions.

Another object of the invention is to provide an O-ring sealed valve of the above character which permits the use of a relatively soft elastomer for the O-rings, without dislodgment for various operating conditions.

Additional objects and features of the invention will appear from the following description in which the preferred embodiments have been set forth in detail in conjunction with the accompanying drawing.

Referring to the drawing:

Figure 1 is a side elevational view in section illustrating a high pressure valve of the gate type making use of O-ring seals.

Figures 2A, 2B and 2C are cross-sectional details on an enlarged scale showing the mounting means for the O-rings, with the O-rings in various operating positions.

Figure 3 is a cross-sectional detail on an enlarged scale showing another embodiment of the invention.

Figure 4 is an enlarged cross-sectional detail illustrating another embodiment.

Figure 5 is a view like Figure 3 but showing another embodiment.

Figure 6 is an enlarged cross-sectional detail showing a further embodiment.

Figure 7 is a side elevational view illustrating a valve of the plug type incorporating the present invention.

Figure 8 is a cross-sectional view taken along the line 15—15 of Figure 7.

Figure 9 is a side elevational view in section illustrating another embodiment of the invention in which the sealing rings are carried by the movable valve member.

Figure 10 is a side elevational view illustrating another embodiment of the invention in which the O-rings are confined for only a portion of their circumference.

Figure 11 is an enlarged cross-sectional detail showing the manner in which a portion of each O-ring is confined in the embodiment of Figure 10.

The gate valve illustrated in Figure 1 consists of a body 10, which for example can be formed of cast metal, and which is provided with the aligned flow passages 11 and 12. The body extensions 13 and 14 that define the passages 11 and 12 can be provided with coupling flanges 16 and 17 or other suitable coupling means to facilitate making connections with associated piping. The main or intermediate portion 18 of the body provides an inner space 19 for accommodating the valve gate 21. This valve member is in the form of a solid gate having flat parallel sides 22 forming valve working surfaces.

One end of the gate 21 is attached by suitable means, such as the pin 23, to the operating stem 24. A bonnet 26 accommodates the stem and is provided with means for establishing a seal both with respect to the body and the stem.

The inner end portion 27 of the bonnet is shown formed cylindrical, and is fitted within the cylindrical bore 28 of the body. A segmental lock ring 29 is accommodated in a groove 31 formed in the body, and serves to retain the bonnet in place. A groove 32 in the body serves to accommodate the resilient O-ring 33, which establishes a fluid tight seal between the bonnet and the body. A plurality of circumferentially spaced ears 34 are formed in the bonnet, and these ears are bored and threaded to receive the screws 35. Upon turning the screws 35 it is possible to apply force to the bonnet tending to urge the same outwardly with respect to the body, thus establishing tight normal engagement between the bonnet and the ring 29. These screws may bear upon an interposed cover washer 36. Suitable means such as the resilient O-rings 37 and 38 establish a fluid tight seal between the bonnet and the stem 24. Lubricant may be applied to space 39 between the rings 37 and 38, through a suitable fitting (not shown). The vent plug 41 may be employed to avoid trapped pressure in space 39. Should the seal 38 fail to function, plug 41 can be replaced by a closure plug whereby seal 37 prevents leakage.

Suitable operating means can be applied to stem 24 to move the gate between open and closed positions. Thus the sleeve 42 surrounds the stem 24, and is attached to the hand wheel 43 or like operating means. The end portion 44 of the sleeve is threaded to engage the threaded portion 46 of the stem. That end portion of the sleeve 42 which extends into the bonnet 26 is provided with a flange 47, which is disposed between the ball bearing assemblies 48 and 49. The arrangement is such that when the hand wheel 43 is turned, the stem 24 and the gate are moved one direction or the other.

Various types of operating gear can be employed for either manual or remote automatic operation. Where remote or power operation is desired, it is possible to use the various types of operating gear now used on valves, such as electric motors, hydraulic jacks, pneumatic diaphragms and pistons, and the like.

The valve gate 21 in Figure 1 is of the type provided with an opening 51 which registers with the passages 11 and 12 for open valve position. Assuming that the passages 11 and 12 are annular in section, the port opening 51 is likewise circular and made to about the same diameter.

On both sides of the gate 21, I provide the resilient seal rings 52 of the O-ring type, together with seal ring mounting means designated generally by numbers 53. The seal rings can be formed of suitable resilient material such as a synthetic rubber like Hycar or Neoprene. Hycar has been satisfactory for a variety of services. The hardness of the material may be of the order of 60 to 80 durometer. The two mounting means serve to retain the O-rings in such a manner that the gate is sealed with respect to the body for closed position of the valve. Each such means is constructed whereby an effective fluid seal is established only on the outflow side of the gate, for closed position of the valve, irrespective of which one of the passages 11 or 12 is made the inflow or high pressure passage.

Each of the mounting means 53 incorporated in the embodiment of Figure 1 consists of an annular member 56 in conjunction with a ring 57. The member 56 has a portion 58 which is formed with a cylindrical periphery to slidably interfit the cylindrical bore 59 formed in the body portion 54.

Portion 58 is provide with an annular groove 61 to accommodate the resilient O-ring 62. This O-ring serves to establish sealing engagement between the member 56 and the body.

Yieldable means serves to urge each member 56 toward the gate 21. Thus each member 56 is shown provided with a plurality of circumferentially spaced cavities 63 to accommodate the compression springs 64. These springs act against the adjacent face 66 of the body portion 54.

Each member 56 provides a flat annular surface 67 which is yieldably urged by the spring 64 into close juxtaposition with the corresponding valve surface 22 of the gate. Ring 57 is loosely fitted within a counter bore or recess 68, formed in member 56, and this ring also provides a flat annular surface 69, which is normally in contact with the surface 22. Preferably the machining is such that there is a slight clearance of say 0.005 inch between the surfaces 67 and 22, whereas surfaces 69 and 22 are urged into direct contact. In many instances it is desirable to form each ring 57 of harder and less corrodible material than the remainder of the valve parts, as for example a good grade of stainless steel.

Each member 56 is formed to provide an annular recess or cavity which accommodates the corresponding O-ring 52. The arrangement is such that normally, disregarding fluid pressures, one side of each O-ring is pressed into sealing contact with the surface 22 of the gate 21, while the other side is pressed into sealing contact with the member 56.

A particular shaping of surfaces is used to define the accommodating recesses 71, in order to secure the desired operation of the O-rings under various operating conditions. Thus the inner periphery of each recess 71 is defined by surface 72, the side remote from the gate by the surfaces 73 and 74, and the side nearest the gate by the surface 75. In section surface 72 can be formed as illustrated to provide the retaining lip 76. Surface 73 is in a plane substantially parallel to the gate, and the contiguous surfaces 74 can be formed whereby in section it is inclined to the face of the gate. Surfaces 74 and 75 in section are inclined with respect to each other at an angle of the order of about 30°. To obtain this inclination surface 74 can for example be of the order of 10° with respect to the surfaces 22. Surface 75 can for example be of the order of 40° with respect to the surface 22. While the cut-back or inclination for surface 74 as indicated above is desirable, good results have been obtained by making surface 74 parallel to the gate, and the surface 75 at an angle of the order of 30° to the gate. Converging surfaces 67 and 75 provide an annual retaining lip 77 that is concentric with and spaced radially from the lip 76. The spacing between the lips 76 and 77 affords the resilient O-ring an opportunity to establish sealing contact with the adjacent surface 22 of the gate. The radial spacing between the lips 76 and 77 is substantially less than the uncompressed cross-sectional diameter of the resilient O-ring, whereby these lips aid in preventing dislodgment of the O-ring during operation of the valve, when the O-ring is subjected to certain forces tending to dislodge the same.

The dimensioning of all of the surfaces forming each recess 71 is such that when an O-ring is in the position illustrated in Figure 2A, with no fluid pressures being applied to the O-ring, and with the member 57 having its free end face in contact with the valve gate surface 22, the O-ring is slightly compressed in the direction of its axis, whereby it establishes sealing contact with both surfaces 73 and 22. When fluid pressure is applied to an O-ring from the body space, the O-ring is distorted by the applied forces in the manner illustrated in the right hand part of Figure 2B, and its side faces maintain sealing contact. When line pressure is applied to an O-ring (assuming a lower pressure in the body space 19) the effect is as shown in the left hand portion of Figure 2B. The O-ring is stretched radially and forced outwardly (with squeezing action or compression) into the tapered recess 71, whereby it is moved to a position out of sealing engagement with the surface 22 of the gate. When such pressure application is relieved the ring returns to its normal position in contact with the gate.

Both of the recesses 71 are in pressure transmitting communication with the valve body space 19, by way of one or more ducts 78. Also the innermost recess corners 79 are in pressure transmitting communication with the passages 11 and 12, through the clearances between the surfaces of the counter bores 68 and the rings 57. This arrangement causes fluid pressure to act upon the O-rings in such a manner as to tend to prevent dislodgment, as will be presently explained.

Guard means can be provided for the gate 21. Thus I have shown metal plates 80 which have turned flanges 81 on their longitudinal edges for engaging the edges of the gate. Corresponding ends of these guard plates are provided with openings 82, for mounting upon the reduced diameters 83 of the members 56. The guard plates are thus carried by the members 56 and are positioned to extend over and protect the gate, particularly when the gate is in closed position. Vent openings 84 are preferably provided in the guard plates as illustrated in Figure 1, to equalize the pressure in the body space 19, with the pressure in the port 51.

Operation of the valve illustrated in Figure 1 is as follows: Assuming that the valve is connected to associated piping and is in the full open position shown in Figure 1, the O-rings 52 will be positioned substantially as illustrated in Figure 2A. The pressure in body space 19 will be the same as in the passages 11 and 12, and therefore no differential pressures are being applied to the O-rings. If, under such conditions, one should vent off fluid from the valve body space 19, a differential pressure is applied to each of the O-rings tending to expand it radially, and to compress it into the recess 71. Therefore both O-rings would be retracted from sealing engagement with the gate, to thereby permit leakage past the same into the valve body. Normally, however, the valve body space 19 is maintained closed.

If the valve gate is moved to closed position without application of line fluid pressure, the O-rings 52 will again occupy the same positions as illustrated in Figure 2A. Now, if fluid pressure is applied to one of the body passages, as for example the left passage 11, differential pressure is applied to one of the O-rings 52, that is the left O-ring of Figure 2B, tending to momentarily expand it radially to disrupt its sealing engagement with the gate. This permits pressure equalization between the inlet passage 11 and the body space 19. As fluid pressure builds up the body space 19 it acts upon the other O-ring to press it more tightly into sealing engagement with the gate and with the member 58, as illustrated for the right hand portion of Figure 2B. Thus a bubble tight seal is maintained on the outlet side of the gate, between the gate and the body. If line pressure is applied to the passage 12, in place of passage 11, the action is the same as just described, that is the corresponding O-ring is expanded to disrupt its sealing contact with the gate, and the O-ring on the opposite side (i.e. outlet or downstream side) of the gate is urged into bubble tight sealing engagement.

When the valve gate is moved between closed and open positions, while relatively high fluid pressure is being applied to one of the passages 11 or 12, fluid pressures are caused to act upon the O-rings in such a fashion that they are not dislodged from their retaining recess. Figure 2C illustrates initial movement of the gate towards open position, with a small part of the port 51 moving past the O-ring to commence the fluid flow. Assuming that the high pressure is applied to the left hand passage 11, flow past the inlet side of the gate between surfaces 67 and 22, acts upon the adjacent portion of the O-ring to expand the same radially into the recess 71, rather than to urge the O-ring in the opposite direction. On the opposite side of the gate, pressure in the recess corner 79 is equalized with the pressure in the outflow passage 12, while the intermediate pressure in the body space 19 is acting upon the exterior surface of the O-ring to urge the same towards the recess corner 79, thus holding it into the accommodating recess and serving to prevent its dislodgment or bulging to an undue extent through the space between the lips 76 and 77. The same operation just described occurs when high pressure is applied to passage 12, instead of passage 11, except that it is now the O-ring on the outflow side of the gate which is urged towards its corresponding recess corner 79.

When the gate is open and no differential pressure is being applied to the same, the compression spring 64 maintains the rings 57 in contact with both surfaces 22 of the gate, and neither of the members 56 is thrust into abutting engagement with the associated body portions 54. However, when the valve gate is in closed or partially closed position, and a differential pressure is being applied to the same, the lateral thrust upon the gate translates the member 56 on the outlet side of the gate into abutting engagement with the adjacent body portion 54, as illustrated in Figure 2B. Thus the line fluid thrust upon the gate is taken by direct engagement of the gate with the ring 57, and the member 56 that is located on the outlet side. Under such conditions the members 56 and ring 57 on the inlet side of the gate follow with the gate, because of the action of the associated compression springs 54. Thus, metal-to-metal contact with the sides of the gate is maintained at all times, to minimize entrance of grit or other foreign material into the body space 19, and to provide a primary seal between the body and the gate.

In addition to the action just described, it will be noted that the members 56 form effective fluid pressure areas, by virtue of the sealing engagement between the O-ring 62 and the body portions 54. On the inlet side of the valve, and assuming that the gate is closed, pressure acting upon the member 56 which is located on the inlet side, tends to urge it against the gate when the body pressure is less than the line pressure.

It is evident from the above that Figure 1 provides a gate valve which makes possible maintenance of a bubble tight seal because of the action of the O-rings, and at the same time the arrangement is such that dislodgement of the O-ring is prevented and a pressure holding seal is established on only the outlet side of the gate.

Valves of the construction shown in Figure 1 are usable upon relatively high fluid pressures as for example pressures of the order of 1,000 p.s.i. or more. The force required to move the gate between open and closed positions is relatively small, even when line pressures are being applied. The valve can be used for relatively long periods of time without servicing, and lubrication is not essential to maintenance of a seal. The O-rings are not subject to excessive wear and they can be readily replaced when it is necessary to service the valve. As previously pointed out, the surface 69 of the ring 57 presses into direct contact with the surface 22 of the gate, on the outlet side, and this serves to prevent any possible extrusion of the rubber of the O-ring between the surfaces 69 and 22. When the valve is being operated the O-rings have a wiping action which serves to remove foreign material and thus maintain clean surfaces for sealing. Should the O-rings fail to maintain a seal because of breakage or excessive wear, a fair metal-to-metal seal is maintained, thus making the valve usable until new O-rings can be installed.

It will be evident from the foregoing that a number of features contribute to maintenance of the O-rings 52 within their accommodating recesses, without dislodgment or undue bulging during operation of the valve. The vents 78 relieve fluid pressure in that portion of each recess 71 which extends about the outer periphery of the corresponding O-ring. As has been previously pointed out, under certain operating conditions this causes the O-ring to be forced outwardly into the recesses 71, with simultaneous retraction from sealing contact with the associated surface 22. The spacing between the lips 76 and 77 aids in retention of the O-ring because this spacing is substantially less than the normal relaxed diameter of the O-ring. The surface 75 being disposed at an inclination to the surface 22, exerts a camming and squeezing action against the O-ring when the O-ring is expanded radially. The clearance between the rings 57 and the corresponding member 56 causes fluid pressure exerted upon the ring on the outflow side of the valve to urge the O-ring into the corner recess 79. The compression springs 64 maintain the mounting assemblies urged in contact with the side surfaces 22 of the gate, whereby normally the O-rings 52 are pressed into contact with the surfaces 22.

Instead of forming each recess 71 in a single annular member 56, it is possible to use a plurality of parts, as illustrated particularly in Figure 3. In this instance the recesses 85, which correspond to the recesses 71 of Figure 1, are formed by the two members 86 and 87. Members 86 are provided with a compression spring 64, the same as in Figure 1. The members 87 are in the form of sleeves which loosely fit upon the outer peripheries of the members 86, and which are constructed to provide the inclined surface 75, and the lips 77. The guard plates 80 are likewise mounted upon the parts 87.

The arrangement of Figure 3 operates in substantially the same manner as Figure 1. The venting of recesses 85 to the valve body space 19 is by virtue of the clearance between the outer and inner peripheries of members 86 and 87. The members 87 are yieldably urged toward the gate because of their engagement with the resilient O-rings.

The modification of Figure 4 provides a different means to prevent sealing upon the inlet side of the valve gate. In this instance the parts 91 and 92 provide a recess 93 for accommodating the resilient O-ring 94. The O-ring contacts the side surface 22 of the valve gate, through the annular spacing between the lips 96 and 97. An insert annulus or washer 98 is inserted within the recess 93, and engages that side of the O-ring which is remote from the gate surface 22.

With the arrangement just described, it will be evident that line pressure may by-pass the O-ring upon the inflow side of the gate, by virtue of fluid flow through the clearance between the parts 91 and 92, between the insert 98 and part 91, and through the ducts 95. However, upon the outflow side fluid pressure applied from the body space 19 tends to urge the O-ring into sealing engagement with the surface 22 to establish a fluid tight seal. Line pressures applied to the O-ring on the inlet side of the gate serve to expand the same radially a small amount until venting is established behind the washer 98.

In the embodiment of Figures 5 and 6, the body extensions 101 correspond to the extensions 54 of Figure 1. These extensions are machined to provide the counter bores 102, which serve to loosely accommodate the annular members 103. Cooperating annular members 104 are slidably carried by the outer peripheral surfaces 106. Members 103 are loosely retained in the valve body extensions 101, by the use of suitable means such as the snap-in rings 107. The arrangement is such that there are substantial tolerances permitting axial movement of the members 103 relative to the body. The O-rings 108 are accommodated within the recesses 109. These recesses are shaped in substantially the same manner as in Figures 1 and 2A to 2C. The spaced concentric lips 111 and 112 are formed on the parts 103 and 104, correspond to the lips 76 and 77 of Figure 1 and aid in retaining the O-rings.

Suitable spring means serves to urge the members 104 toward the gate. Thus a plurality of compression springs 113 are provided for each member 104, and these springs engage circumferentially spaced studs 114 which are carried by the rings 116. The rings are seated upon the body extensions 101.

Operation of the embodiment illustrated in Figures 5 and 6 is the same as previously described for Figure 1 and Figure 3. A fluid tight seal is established in the same manner upon the outlet side of the gate, irrespective of the valve passage to which the high pressure is applied.

Figures 7 and 8 illustrate the invention incorporated in a plug valve of the cylindrical type, and makes use of O-ring mounting means having characteristics similar to the mounting means of Figure 1. In this case the valve body 181 is provided with the flow passages 182, and is provided with a lateral bore 183 to accommodate the cylindrical plug 184. The upper end portion 186 of the plug is of reduced diameter to form an operating stem which can be engaged by various types of operating gear. Both the end portion 186, and the other end portion 187, are carried by the bearing assemblies 188 and 189. The ball bearing assemblies are held in place by the end annuluses 191 and 192, which in turn are retained by suitable means such as the snap-in rings 193 and 194. The plug has a transverse flow port 196 which is adapted to register with the passages 182 for full open position of the valve.

Sleeve means, preferably in the form of a plurality of sections, is inserted between the periphery of the plug and the body to provide mounting means for the resilient O-rings 197 and 198. These O-rings are adapted to seal on areas surrounding the inlet and outlet passages when the valve is in the closed position shown in Figure 8. The sleeve insert means includes the similar and oppositely faced parts 199, each of which includes the portions 199a which extend longitudinally of the axis of the plug, and the portions 199b which join the longitudinally extending portions 199a, in regions adjacent the end portions of the plug. In conjunction with the parts 199, I provide the sleeve-like members 201, which are loosely fitted within the counter bores 202. The adjacent edges of the parts 199 and members 201 are formed to provide the O-ring accommodating recesses 203. The arrangement is such that when viewed in a direction parallel to the axis of the passages 182 the O-rings are substantially circular. However, it should be understood that this shaping is not critical, and that in some instances the O-ring may be bent to oval or other modified form, provided it generally embraces the passages 182.

The defining surfaces for the O-ring retaining recesses 203 are shaped in the same general manner as described with reference to Figures 2A–2C. Thus when an O-ring on the inlet side of the valve is expanded radially by applied fluid pressure, it is caused to disengage the peripheral surface of the plug to permit fluid to vent past the same. Thus with the valve construction of Figures 7 and 8, the seal, when the valve is in closed position, is always established on the outflow or downstream side of the valve, that is between the plug and the body by virtue of the O-ring which is located adjacent the outflow side.

In assembling the valve illustrated in Figures 7 and 15, it is convenient to first insert the members 201, after which the O-rings are placed within the recesses, parts 199 applied, and then the plug positioned within the body. Suitable means can be employed for maintaining the parts 199 stationary with respect to the body while the valve plug is being turned. For example, the portions 199a can be provided with longitudinally extending ribs 206, which interlock with corresponding grooves formed in the body.

When a plug valve of the type shown in Figures 7 and 8 is used with liquids, there is a possibility that the port passage 196 may be filled with liquid when the valve is in closed position. If under such conditions there should be a substantial rise in temperature, the liquid might exert undue pressure upon the body, because it could not escape past the O-rings 197. To take care of such conditions, I can provide a small high pressure release valve 207. This valve can be mounted within a bore 208 provided in one end of the plug, and can consist of a mounting plug 209 which is threaded within the bore and which carries a movable valve member 211. The valve member is urged toward a stationary seat 212 by the compression spring 213. Any excessive pressure in the port 196 serves to unseat the valve member 211, thus permitting liquid to vent through duct 214 into one of the flow passages 182.

The plug valve of Figures 7 and 8 can be made to various sizes and designs. While these figures illustrate a simple plug valve provided with a single port, the invention can be applied to multi-port valves, where two or more ports are provided in the plug.

Figure 9 shows another embodiment in which the O-rings are mounted in the gate, instead of on the body. Thus the body portions 216, which define the flow passages 217 have flat parallel end faces to cooperate with the gate 218. The mounting means for each O-ring 219 is carried by the gate and provides an accommodating recess 220. Each recess is shaped similar to the accommodating recesses of Figure 1, and is defined by the annulus 221 and disc 222, which are set flush into the gate and attached to the gate by suitable means. One or more openings 223, together with clearance between each disc and the gate, serves to vent the bottom corner of the recess 220 to the associated passage 217. Clearance about each annulus 221, or one or more vent ducts (not shown) serve to vent the outer portion of each recess 220 to the body space. The body portions 216 are loosely fitted with the rings 224, which have an outer diameter slightly smaller than the mean diameter of the O-rings.

Features of Figure 9 not claimed herein are disclosed and claimed in my copending application Serial No. 767,047, filed October 13, 1958.

Operation of the valves shown in Figure 9 is similar to Figure 1. The pressure holding seal is established on the outflow side of the gate, and the arrangement prevents a pressure holding seal on the inflow side. Assuming that the valve is in closed position and that line pressure is applied to one side of the same, as one commences to move the gate toward open position, the initial part of this movement shifts a part of each O-ring into contact with portions of the rings 224, whereby fluid pressure in the accommodating recess 220 on the downstream side of the gate is permitted to equalize with the downstream pressure, before any substantial part of the downstream O-ring is exposed for dislodgment from its accommodating groove. Communication with the outflow passage through the ducts 223, likewise contributes to such pressure equalization.

In the foregoing particular reference has been made to the use of seal rings made of resilient synthetic rubber like Hycar or Neoprene. In some instances it is desirable to use resilient material which is resistant to temperatures and pressures higher than that which can be used with ordinary synthetic rubber or which may better resist the chemical action of certain gases or fluids. Seal rings made of Nylon or Teflon are usually harder than 80 durometer, and they cannot be so readily dislodged from their accommodating recesses, particularly when held in place by the use of retaining lips.

Figures 10 and 11 illustrate another embodiment of the invention making use of a solid valve gate 226, corresponding to the gate 21 of Figure 1. The two annular portions 227 of the valve body, corresponding to the portions 54 of Figure 1, are machined to provide the bores 228, which loosely accommodate the annular seat rings 229. Each seat ring is provided with O-ring retaining lip 231. The resilient O-rings 232 are normally stretched circumferentially, and they are adapted to be slightly compressed between the side working surfaces 233 of the valve gate, and the surfaces 234 formed on the adjacent end faces of the annular body portion 227. The ends of the annular body portions 227 are also beveled to provide the inclined surfaces 236. An O-ring retainer 237 is mounted upon each annular portion 227, and in this instance consists of a half segment of a cylinder as illustrated, together with an O-ring retaining lip 238. Suitable means such as screws 239 serve to secure each retainer 237 upon the body.

It is assumed that the valve gate 226 of Figure 10 is provided with a port 241, and that the gate is moved downwardly from open to closed position.

As previously explained in connection with Figures 2A–2C, when the gate 226 is moved upwardly from closed toward open position, the valve working surfaces 233 of the gate are first separated from sealing contact with the lower portions of the O-rings 232. Assuming that relatively high pressure is applied to one side of the valve, the initial part of such opening movement is critical in that fluid forces act upon the O-rings tending to dislodge them from their accommodating recesses. In the embodiment of Figure 10, the accommodating recess for each O-ring 232 leaves the exterior periphery of each O-ring exposed to pressure in the valve body. The retainers 237 do not prevent such exposure to body pressure, because the space 242 within each retainer is in unrestricted communication at its ends with the body space. Additional vent ducts 243 can be provided to insure free unrestricted communication between space 242 and the body space. Assuming that the valve gate is closed and that pressure is applied to say the left hand side, in excess of the body pressure, equalization immediately occurs between the upstream side and the body space, by virtue of the fact that fluid pressure differential acting outwardly upon the upstream O-ring 232 stretches this ring circumferentially, whereby that portion of the O-ring which is not retained by means 237, separates from sealing contact with one or both of the surfaces 233 and 234. In other words any outward stretching or expansion of an O-ring to bring it within the region of the surface 233, immediately removes the compression imposed between surfaces 233 and 234, thus permitting fluid flow past the same. A fluid pressure seal is always maintained upon the downflow side, because here the fluid pressure differential acts upon the outer peripheral surfaces of the downstream O-ring with the result that this O-ring is tightly pressed against the lip 231 and the outer peripheral surface of the corresponding seat ring 229. While each retainer 237 engages only a portion (i.e. segment) of the corresponding O-ring, this is sufficient to prevent O-ring dislodgment for movements of the gate between closed and open positions, particularly because the forces tending to prevent dislodgment act upon the segmental portion of each O-ring that is exposed during movements of the gate, rather than upon the other portion which is in contact with the gate.

This application is a continuation-in-part of my co-pending application Serial No. 331,839, filed January 19, 1953, now abandoned for Valve Construction, and my application Serial No. 271,037, filed February 11, 1952, now Patent No. 2,810,542, issued October 22, 1959, entitled Valve Construction, referred to therein.

I claim:

1. In a valve construction, a body providing flow passages and a space between said passages, a valve member movable in said space between open and closed positions for controlling the flow of fluid through said passages, a pair of resilient seal rings of the O-ring type disposed on opposite sides of the valve member and arranged to generally embrace said passages, and mounting means for each of said O-rings, each of said mounting means forming a continuous annular recess for accommodating the associated O-ring, each recess having an outer extension into which the corresponding O-ring is adapted to be displaced upon application of a fluid pressure differential to its inner surface, each recess extension being separated from the adjacent side surface of the valve member by an interposed lip forming a part of the mounting means whereby the O-ring is separated from contact with the valve member when squeezed within said recess to thereby establish fluid communication between the corresponding passage and the body space, each of said mounting means also including means for causing the corresponding seal ring to establish a fluid pressure seal between the valve member and the body responsive to fluid pressure differential being applied to the same from the body space.

2. A valve as in claim 1 in which each of said recess extensions is in fluid communication with the body space.

3. In a valve construction, a body providing flow passages and a space between said passages, a ported valve gate movable in said space between open and closed positions for controlling the flow of fluid through said passages, said valve gate having parallel side surfaces, a pair of resilient seal rings of the O-ring type disposed to normally engage the side surfaces of said gate and generally embracing said passages, and mounting means for each of said O-rings, each mounting means forming a continuous annular recess for accommodating the associated O-ring and providing spaced concentric inner and outer O-ring retaining lips, each such recess having an outer extension into which the associated O-ring is adapted to be squeezed responsive to application of a fluid pressure differential to its inner surface from the corresponding passage, said outer lip serving to separate the O-ring from the corresponding side surface of the valve member when the O-ring is squeezed into said recess thereby forming means to separate the associated O-ring from sealing engagement with the valve member, each of said O-rings being adapted normally to have contact with the adjacent surface of the valve member in a region between said lips to thereby establish seals between the valve member and the body.

4. A valve as in claim 3 in which each of said recess extensions is in fluid communication with the body space.

5. In a valve construction, a body member provided with flow passages and a space between said passages, a valve member disposed within the body and movable in said space between open and closed positions for controlling the flow of fluid through said passages, a pair of seal rings of the O-ring type formed of resilient material, and mounting means for said seal rings, said seal rings being disposed to embrace said passages on opposite sides of the valve member for closed position of the valve member, the mounting means forming recesses for loosely accommodating the seal rings, each of said mounting means and its corresponding recess being formed to provide means for causing at least a portion of the seal ring to be moved outwardly in a general radial direction with respect to the axis of said passages and disengaged from sealing engagement between the mounting means and the valve member responsive to fluid pressure differential applied to the inner peripheral surface of the seal ring, to thereby establish pressure equalizing fluid communication between the corresponding passage and the body space, each of said mounting means also including means for causing the associated O-ring to establish and maintain a fluid pressure holding seal between the mounting means and the valve member responsive to fluid pressure differential acting upon the outer peripheral surface of the seal ring, whereby when either one of said passages is connected to function as the upstream side of the valve, fluid pressure equalizing communication is established between the upstream passage and the body space and a pressure holding seal is established by the downstream seal ring.

6. A valve as in claim 5 in which said valve member is in the form of a ported gate having parallel sides forming valve working surfaces normally engaged by said seal rings, each of said mounting means serving to retain in its associated recess only that circumferential portion of the seal ring that is exposed when the valve member is moved from closed to open position of the same, the remaining circumferential portion of each seal ring being free to move outwardly in response to differential fluid pressure applied to its inner periphery thereby to establish fluid pressure equalizing communication between the upstream passage and the body space.

7. A valve as in claim 5 in which the valve member is in the form of a ported plug having its axis extending transversely of the passages, and which can be rotated about its axis between open and closed positions.

References Cited in the file of this patent

UNITED STATES PATENTS

| | | |
|---|---|---|
| Re. 24,102 | Ohls | Dec. 13, 1955 |
| 2,547,831 | Mueller | Apr. 3, 1951 |
| 2,606,740 | Allen | Aug. 12, 1952 |
| 2,621,885 | Schmitt | Dec. 16, 1952 |
| 2,674,436 | Jones | Apr. 6, 1954 |
| 2,676,782 | Bostock | Apr. 27, 1954 |
| 2,747,611 | Hewitt | May 29, 1956 |
| 2,810,543 | Bryant | Oct. 22, 1957 |